United States Patent

[11] 3,634,632

[72] Inventor Christopher Alan Watson
Takeley, England
[21] Appl. No. 869,693
[22] Filed Oct. 27, 1969
[45] Patented Jan. 11, 1972
[73] Assignee Standard Telephones and Cables Limited
London, England
[32] Priority Nov. 29, 1968
[33] Great Britain
[31] 56,768/68

[54] MAGNETIC RECORDING DEVICE WITH PRINTED CIRCUIT COILS FORMED WITH THE CIRCUIT SHEET FOLDED IN CONCERTINA FASHION
3 Claims, 4 Drawing Figs.

[52] U.S. Cl. .......... 179/100.2 C, 29/603, 336/200
[51] Int. Cl. .......... G11b 5/20, G11b 5/42, H01f 7/06
[50] Field of Search .......... 179/100.2 C; 340/174.1 F; 346/74 MC; 29/603; 335/282; 336/200

[56] References Cited
UNITED STATES PATENTS
2,804,506 8/1957 Schurch et al. .......... 179/100.2 C
3,156,919 11/1964 Rutter .......... 340/174.1 F
OTHER REFERENCES
" Wear Coating For A Tapehead," IBM Tech. Disc. Bull., Groben et al., Vol. IX, No. 9, Feb. 1967, Pg. 1967
" Printed Circuit Coil," IBM Tech. Disc. Bull., Moreno, Vol. XII, No. 6, Nov. 1969, pg. 77B

*Primary Examiner*—Bernard Konick
*Assistant Examiner*—Robert S. Tupper
*Attorneys*—C. Cornell Remsen, Jr., Walter J. Baum, Paul W. Hemminger, Percy P. Lantzy, Philip M. Bolton, Isidore Togut and Charles L. Johnson, Jr.

ABSTRACT: The multihead recording device and a method of making same wherein a row of energization windings is constructed from a single printed circuit assembly of parallel wavy lines of conductor material on a nonmagnetizable sheet. The sheet is folded concertina fashion to form helices of the parallel wavy lines. A hole is made axially through each helix and a single core piece of magnetizable material is fitted therein. The assembly is thereafter encapsulated in a block of potting compound, with the end of each core and the last turn of the corresponding windings being flush with the recording surface of said block.

INVENTOR
CHRISTOPHER A. WATSON
BY Mark L. Hopkins
AGENT

INVENTOR
CHRISTOPHER A. WATSON
BY Mark L. Hopkins
AGENT

MAGNETIC RECORDING DEVICE WITH PRINTED CIRCUIT COILS FORMED WITH THE CIRCUIT SHEET FOLDED IN CONCERTINA FASHION

BACKGROUND OF THE INVENTION

The invention relates to magnetic recording devices which have a particular but not necessarily exclusive application in electrographic printing and/or display apparatus and to methods of making such devices.

In electrographic printing and/or display apparatus of the kind wherein the recording surface of either a print drum or band is selectively magnetized to form a pattern or latent image or images thereon representative of information contained in a signal applied to the apparatus, and wherein the print drum or band is passed through or relative to a powder applicator containing magnetic printing powder which is attracted to the electromagnetically formed latent image or images to develop same and to form a powder image which may be viewed at a display position and/or transferred to a permanent record by printing means which form part of the apparatus, the latent magnetic image or images may be in the form of dot patterns, the spacing between dot centers, which in practice could be as small as say 0.0065 inches, being determined by the size of the image to be recorded and the size of the dot matrix from which the image is formed. Generally, the recording of the required dots in any one of the rows or columns of the dot matrix, i.e., the dots which are respectively associated with a row of magnetic recording heads, each dot in a row or column of the dot matrix being associated with a separate one of the row of magnetic recording heads. The complete image is recorded by causing relative movement between the recording heads and the recording surface. The construction of a magnetic recording device to accurately effect the recording of the dot patterns gives rise to numerous problems which are in the main due to the smallness of the spacing which is generally required between the recording heads, the need to utilize a construction which lends itself to batch or mass production without suffering a loss in accuracy on the spacing between and the alignment of the magnetic recording heads, and the production costs.

SUMMARY OF THE INVENTION

The invention provides a magnetic recording device including a plurality of rodlike cores of magnetizable material, a plurality of helical energizing windings through each one of which a separate one of said cores passes, and a support block of nonmagnetic material within which said cores and windings are encapsulated such that at least one end of each of said cores is flush with a recording surface thereof which is adapted to be adjacent to a recording medium, wherein the helical energizing windings are provided by a plurality of parallel wavy lines of conductive material formed on at least one major surface of a sheet of insulating material which is folded concertina fashion on a pitch equal to the pitch or a multiple of the pitch of said wavy lines thereby forming said windings, those portions of the sheet of insulating material in the center of each one of said windings being provided with at least one through hole to facilitate the fitting of said cores.

The invention also provides a method of making a magnetic recording device including the steps of providing a sheet of insulating material having a layer of conductive material on at least one of the major surfaces thereof, forming a series of holes in the composite sheet which are arranged in a coordinate array of rows and columns, the rows being parallel with an edge of said sheet, removing sections of the conductive material to form a plurality of parallel wavy lines and leadout conductors therefor on at least one major surface of said sheet, each one of said plurality of parallel wavy lines being associated with a separate one of the rows of said coordinate array of holes in a manner such that alternate ones of the row of holes are located on opposite sides of the associated wavy line and positioned at the point of maximum excursion of said associated wavy line, folding the sheet of insulating material concertina fashion in a plane at right angles to said edge of said sheet on a pitch equal to the pitch or a multiple of the pitch of said wavy lines thereby forming a helical winding from each one of said wavy lines having at least one through hole formed by the associated row of said coordinate array of holes, locating a core member in the hole or holes associated with each of the helical windings, and encapsulating the members and associated helical windings in a body of nonmagnetic material in a manner such that at least one end of each of said core members is flush with a recording surface thereof.

The invention further provides a method of making a magnetic recording device including the steps of providing a sheet of insulating material having a layer of conductive material on at least one of the major surfaces thereof, removing sections of the conductive material to form a plurality of parallel wavy lines and leadout conductors therefor on at least one major surface of said sheet, the plurality of parallel wavy lines being parallel with an edge of said sheet, folding the sheet of insulating material concertina fashion in a plane at right angles to said edge of said sheet on a pitch equal to the pitch or a multiple of the pitch of said wavy lines thereby forming a helical winding from each one of said wavy lines, forming at least one through hole in those portions of said sheet located in the center of each one of said helical windings, locating a core member in the hole or holes associated with each of the helical windings, and encapsulating the core members and associated helical windings in a body of nonmagnetic material in a manner such that at least one end of each of said core members is flush with a recording surface thereof.

The invention further provides a method of making a magnetic recording device including the steps of providing a sheet of insulating material, forming a series of holes in said sheet which are arranged in a coordinate array of rows and columns, the rows being parallel with an edge of said sheet, depositing a plurality of parallel wavy lines of conductive material on at least one of the major surfaces of said sheet together with leadout conductors therefor, each one of said plurality of parallel wavy lines being associated with a separate one of the rows of said coordinate array of holes in a manner such that alternate ones of the row of holes are located on opposite sides of the associated wavy lines and positioned at the point of maximum excursion of said associated wavy line, folding the sheet of insulating material concertina fashion in a plane at right angles to the pitch or a multiple of the pitch of said wavy lines thereby forming a helical winding from each one of said wavy lines having at least one through hole formed by the associated row of said coordinate array of holes, locating a core member in the hole or holes associated with each of the helical windings, and encapsulating the core members and associated helical windings in a body of nonmagnetic material in a manner such that at least one end of each of said core members is flush with a recording surface thereof.

The invention further provides a method of making a magnetic recording device including the steps of providing a sheet of insulating material, depositing a plurality of parallel wavy lines of conductive material on at least one of the major surfaces of said sheet together with leadout conductors therefore, the plurality of parallel wavy lines being parallel with an edge of said sheet, folding the sheet of insulating material concertina fashion in a plane at right angles to said edge of said sheet on a pitch equal to the pitch or a multiple of the pitch of said wavy lines thereby forming a helical windings from each one of said wavy lines, forming at least one through hole in those portions of said sheet located in the center of each one of said helical windings, locating a core member in the hole or holes associated with each of the helical windings, and encapsulating the core members and associated helical windings in a body of nonmagnetic material in a manner such that at least one end of each of said core members is flush with a recording surface thereof.

BRIEF DESCRIPTION OF THE DRAWINGS

The foregoing and other features according to the invention will be better understood from the following description with reference to the accompanying drawings, in which.

DESCRIPTION OF THE PREFERRED EMBODIMENTS

In order that the magnetic recording device according to the invention may be accurately constructed and produced economically either by batch or mass production techniques it utilizes a printed circuit arrangement for the plurality of helical energizing windings which form part of the device.

Figure 1:
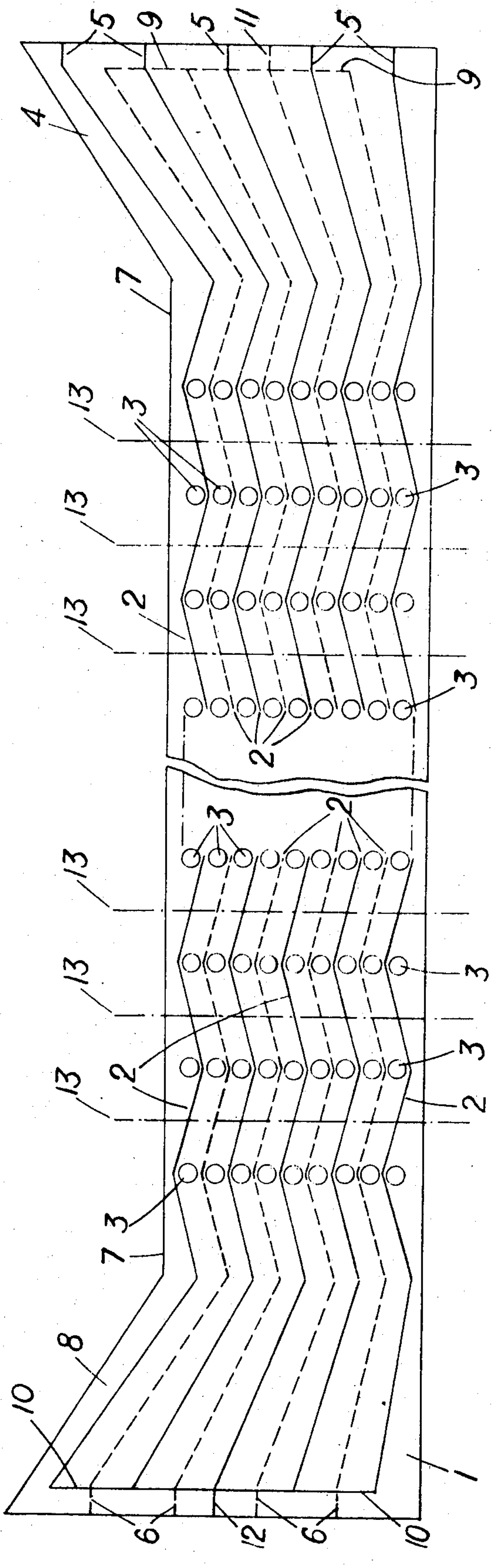
FIG. 1 shows diagrammatically a plan view of the development of the helical energizing windings which form part of the magnetic recording device according to the invention.

The development of the helical energizing windings is shown diagrammatically in the drawing according to FIG. 1 and basically it consists of a thin sheet 1 of insulating material, for example a thermoplastics material having a plurality, i.e., nine, of parallel wavy lines 2 of conductive material, for example copper, formed on the surface thereof in a manner such that alternate ones of the array of nine wavy lines 2 are formed on opposite surfaces, i.e., five of the wavy lines 2 are formed on one of the major surfaces and four (in dotted detail in FIG. 1) of the wavy lines 2 are formed on the other major surface.

A number of holes 3 are provided in the thin sheet 1 which are arranged in a coordinate array of rows and columns, with the rows being parallel to the edge 7 of the sheet 1, the series of holes 3 in each row of the coordinate array being associated with a separate one of the wavy lines 2 in a manner such that alternate ones of the series of holes 3 are located on opposite sides of the associated wavy line 2 and positioned at the point of maximum excursion of the wavy line. Thus the series of holes 3 in each column of the coordinate array are each associated with a separate one of the wavy lines 2 and positioned at the point of maximum excursion of the wavy line.

When utilized in magnetic recording apparatus, each recording track, i.e., each one of the single row of recording heads, of the magnetic recording device is connected via the energizing windings thereof to the character generation and recording track selection logic, i.e., one end of the energizing winding is connected to the recording track selection logic and the other end thereof is connected to the character generation logic.

In practice, the energizing windings are each connected to the recording track selection logic via an access diode and since as previously stated it is possible for the spacing between dot centers to be 0.0065 inches thereby giving a spacing of 0.013 inches between alternate ones of the wavy lines 2 it is necessary, in order to facilitate the soldering of the diodes to one end of the energizing windings, to enlarge the ends of the thin sheet 1 in a manner as shown in FIG. 1 of the drawings.

These enlargements at each end of the thin sheet 1 which are provided by gradually increasing the width of the sheet 1 at the edge 7 thereof, allows the spacing between the ends of alternate ones of the wavy lines 2 to be increased by a desired amount sufficient to enable the diodes to be connected thereto. It should, however, be noted that when diodes are utilized having dimensions which can be accommodated, the enlargements at the ends of the thin sheet 1 would not be required. As shown in FIG. 1, leadout conductors 5 are provided at one end 4 of the sheet 1 for the wavy lines 2 on said one major surface thereof and leadout conductors 6 (in dotted detail) are provided at the end 8 of the sheet 1 for the wavy lines 2 on said other one of the major surfaces.

It is usual in a practical system for the output of the character generation logic to be simultaneously applied to all the recording tracks of the magnetic recording device. Therefore, the wavy lines 2 on each side of the thin sheet 1 are connected together at one end thereof as shown in FIG. 1 by means of the conductors 9 and 10 which are respectively located at the ends 4 and 8 of the thin sheet 1. Leadout conductors 11 and 12 are respectively provided for the conductors 9 and 10 which, in the completed device, are connected together and to the character generation logic.

Figure 2:
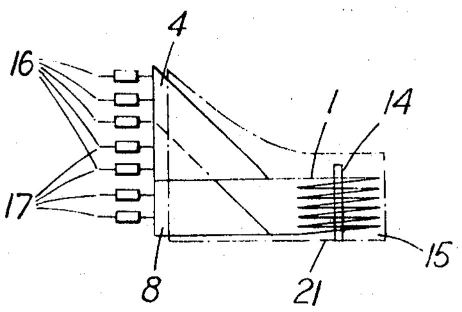
FIG. 2 illustrates a side view of one arrangement of the magnetic recording device according to the invention.

In order to construct a magnetic recording device, the center section of the thin sheet 1 is folded concertina fashion along the chain-dotted lines 13 which are on a pitch equal to the pitch of the wavy lines 2, and when the ends 4 and 8 of the sheet 1 are provided, they are twisted through an angle of 90° to give the structure shown in the drawing according to FIG. 2. When the center section of the sheet 1 is folder each one of the wavy lines 2 will be formed into a helical winding and the series of holes 3 associated with each one of the wavy lines 2 will be coaxial and located at the center of the helical winding. Thus a single row of helical windings, each having a substantially central through hole, will be provided.

The manufacture of the printed circuit arrangement shown in the drawing according to FIG. 1 may be effected in several ways and typical examples of these are outlined in the subsequent description with reference to FIG. 1.

In one method of manufacturing the printed circuit, the starting material is thin rectangular sheet of insulating material, for example a thermoplastics material coated on each side with a layer of conductive material, for example copper.

A coordinate array of holes are then etched through the layer of conductive material on each side of the sheet of insulating material after appropriate masking against etching by, for example, a photolithographic technique thereby exposing on each of the major surfaces of the sheet of insulating material a coordinate array of circular areas of insulating material.

When it is required to have the enlarged ends 4 and 9 (FIG. 1), the masking of the layers of conductive material is arranged such that a trapezoidal section is also removed from each of the layers of conductive material during the etching of the coordinate array of holes thereby exposing the underlying insulating material and shaping the layers of conductive material in the form of the development according to FIG. 1.

In the next stage of this manufacturing method, the remaining parts of the layers of conductive material are utilized as masks and the exposed areas of the sheet of insulating material are etched away to provide the desired shape for the development of the printed circuit with the coordinate array of holes 3 therein. It is therefore necessary in this instance to utilize an etch solution which will attack the insulating material but not the conductive material.

In the final stage, those areas of the layers of conductive material which surround the wavy lines 2, conductors 9 and 10 and leadout conductors 5, 6, 11 and 12 are etched away after appropriate masking against etching by, for example, a photolithographic technique, to give the required structure as shown in FIG. 1.

Alternatively, the printed circuit arrangement, according to FIG. 1 could be manufactured in a similar manner to the method outlined in the preceding paragraphs except instead of etching the coordinate array of holes in the composite sheet they could be punched, drilled or burnt for example, by means of a laser, through the sheet 1 either before or after the center section of the thin sheet 1 has been folded.

In another method of manufacturing the printed circuit, the starting material is a thin rectangular sheet of insulating material, for example a thermoplastics material having, when it is required to have the enlarged ends 4 and 8 (FIG. 1), a trapezoidal section removed from one of the longitudinal edges thereof, thereby shaping the sheet of insulating material in the form of the development according to FIG. 1.

The wavy lines 2, conductor 10 and leadout conductors 5 and 12 are then formed on one of the major surfaces of the sheet 1 by depositing a conductive material thereon after appropriately masking the said one of the major surfaces.

The wavy lines 2, conductors 9 and leadout conductors 6 and 11 are then provided on the other major surface of the sheet 1 in a similar manner.

In this method of manufacture the holes 3 are provided in the sheet 1 by etching, punching, drilling or burning either before or after the deposition processes or by punching, drilling or burning the center of each helical winding after the center section of the thin sheet 1 has been folded.

It should be noted that it is not absolutely necessary to provide the plurality of parallel wavy lines or both sides of the sheet 1, they could all be provided on one side in which case an extra step of providing an insulating layer over the plurality of parallel wavy lines would be required in the manufacturing methods outlined in the preceding paragraphs.

It will of course be appreciated that when the plurality of parallel wavy lines are on one side only of the sheet 1, it would only be necessary in the first-mentioned manufacturing method to have a layer of conductive material on one side of the sheet of insulating material having, when it is required to have the enlarged ends 4 and 8 (FIG. 1), a trapezoidal section removed from one of the longitudinal edges thereof, and it would not be possible to provide the coordinate array of holes 3 by the proposed etching process.

It should also be noted that with this arrangement a separate leadout conductor would need to be provided at one end of each of the wavy lines the other ends thereof being connected together and provided with a single leadout conductor.

As shown in FIG. 2, a rodlike core 14 is placed in each of the holes provided at the center of the helical windings and the complete assembly is encapsulated in a potting compound to form a support block, which is shown by the chain-dotted line 15, for the core and coil assemblies. One end of each of the cores 14 is arranged to be flush with the recording surface 21 of the support block 15 and it is very important that the ends of the helical windings should be as close as possible to the recording surface 21 since the efficiency of the recording device is dependent to a large extent on how close the ends of the windings are to the recording surface 21.

The magnetic recording device illustrated in FIG. 2 is shown with the access diodes 16 and 17 respectively connected at one end thereof to the ends 4 and 8 of the sheet 1, two of the access diodes 17 being in this side view located behind two of the access diodes 16.

In order to increase the magnetic flux field generated at the recording surface 21 by each head it may be desirable to provide some form of flux return path between the two ends of each core.

Figure 3:
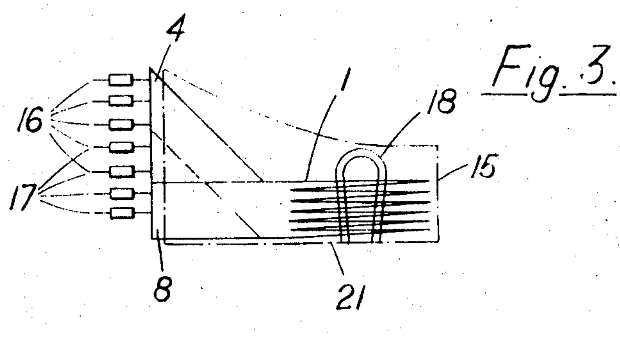
FIG. 3 illustrates a side view of another arrangement of the magnetic recording device according to the invention.

FIG. 3 illustrates how this may be achieved by utilizing a U-shaped core member 18. With this arrangement it is therefore necessary to provide two through holes at the center of each of the windings and this is achieved by folding the center section of the sheet 1 concertina fashion along alternate ones of the chain-dotted lines 13 i.e., on a pitch which is twice the pitch of the wavy lines 2.

Figure 4:
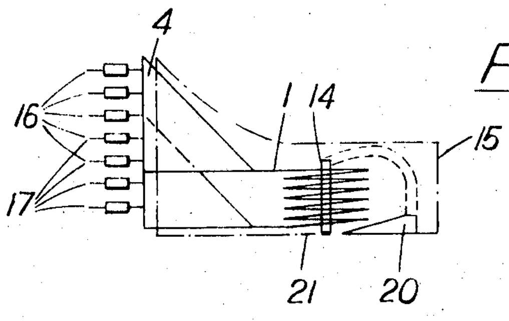
FIG. 4 illustrates a side view of an alternative arrangement for the magnetic recording head illustrated in the drawing according to FIG. 2

Alternatively the support block may include a separate piece of magnetic material 20, FIG. 4, placed in close proximity to the recording end of each core 14 and extending upwards and away from the core to form at least part of the flux return path, the remainder of which is indicated by the dotted lines.

The cores require low-coercivity, high-saturation magnetization and are not limited to soft iron. Other materials such as radiometal or mile steel are satisfactory, provided they are not too brittle to withstand the bending required for the construction illustrated in FIG. 3.

While the recording device so far has been referred to in terms of electromagnetic printing only, it will be appreciated that the head structure is also suitable for recording and/or replay heads for other electromagnetic recording processes, such as tape recording and magnetic drum storage.

Although for most applications potting of the cores in a plain epoxy resin compound is quite satisfactory, it is possible to impregnate the compound with fillers such as amorphous silica to reduce wear of the recording surface. Alternatively air ducts may be drilled or otherwise provided to enable the head to be supported and located on an air bearing if the circumstances permit.

It will be appreciated that the problem of wear is important when the ends of the windings are located virtually at the recording surface of the head. Yet another method of combating wear is to leave the end turns of the windings exposed and to cover the recording surface with a replaceable film of wear resistant materials which should not exceed 0.002 inches in thickness. Material which may be used include wear resistant plastics films. Alternatively the recording surface may have a film of material such as silicon nitride deposited thereon by a glow discharge process.

Other potting compounds may be used where the properties of the potting compound may effect the performance of the head. For example, temperature considerations may call for the use of compounds other than epoxy resins.

In order to provide a recording head with a large number of tracks it may, depending on the number of tracks required, be advantageous to utilize a plurality of the recording device according to the invention coupled together in series.

What is claimed is:

1. A magnetic recording device having a recording surface arranged to be adjacent to a recording medium, comprising a plurality of rodlike cores of magnetizable material, a plurality of helical energizing windings through each one of which a separate one of said cores passes, and a support block of nonmagnetic material within which said cores and windings are encapsulated with at least one end of each core being flush with the recording surface thereof, the helical energizing windings being provided by a plurality of parallel undulating lines of conductive material formed on at least one major surface of a sheet of insulating material folded in concertina fashion with a pitch equal to the pitch or a multiple of the pitch of said undulating lines, the portions of the sheet of insulating material in the center of each one of said windings being provided with at least one through hole to facilitate the fitting of said cores.

2. A magnetic recording device as claimed in claim 1 wherein the said cores and windings are embedded in an epoxy resin potting compound, wherein the epoxy resin potting compound includes an amorphous silica filler material, and wherein the recording surface is covered with a thin film of wear resistance material.

3. A magnetic recording device as claimed in claim 2 wherein said rodlike cores are arranged in a row with one end of each core being flush with the recording surface, and wherein the recording device further includes a body of magnetic material embedded in said support block, said body extending longitudinally adjacent the row of cores at the recording surface with the surface of said body which faces said cores initially diverging from the cores and away from the recording surface.

* * * * *